Sept. 15, 1964 F. W. LEHAN ETAL 3,149,308

DECODER NETWORK

Filed Nov. 9, 1959

3 Sheets-Sheet 1

FRANK W. LEHAN
RAY W. SANDERS
ALVIN W. NEWBERRY
INVENTORS

BY Allen E. Botney

ATTORNEY

FRANK W. LEHAN
RAY W. SANDERS
ALVIN W. NEWBERRY
INVENTORS

BY Allen E. Botney

ATTORNEY

FRANK W. LEHAN
RAY W. SANDERS
ALVIN W. NEWBERRY
INVENTORS

BY Allen E. Botney
ATTORNEY

United States Patent Office 3,149,308
Patented Sept. 15, 1964

3,149,308

DECODER NETWORK

Frank W. Lehan and Alvin W. Newberry, Glendale, and Ray W. Sanders, Los Angeles, Calif., assignors to Space-General Corporation, Glendale, Calif., a corporation of California Filed Nov. 9, 1959, Ser. No. 851,766
13 Claims. (Cl. 340—147)

The present invention relates in general to the field of communications and more particularly relates to a decoder network for use in a communication system to decode previously encoded data signals.

Due to the advantages offered by digital techniques, many of our modern day communication systems, such as Teletype or telemetry systems, rely upon some form of digitalized signal transmission. Where this is the case, primary operation generally consists of sampling an input data source, quantizing the data sample, transmitting a binary coded representation of the quantized data sample, receiving and decoding the data, and either storing or displaying a measure of the information received.

To decode the received signals, systems of the type mentioned include a decorder network whose purpose and function it is to identify the binary coded data signal so that the original bit of data may ultimately be reproduced therefrom. The present invention is a decoder network of this type and embodies a new and novel approach to the problem of reproducing data from the binary coded signals representing such data.

According to the basic concept of the present invention, the many "bits" of information contained in a received binary coded signal and received in time sequence is stored in such a manner that continuous nondestructive readout of the stored information is made possible. As a result, each succession of information bits can be simultaneously compared, thereby allowing the information bits to be linearly summed and differenced according to patterns corresponding to the coding scheme employed. In essence, therefore, a signal correlation scheme is provided.

More particularly, in a preferred embodiment of a decoder network according to the present invention, each received binary-coded signal is applied to a multi-tapped magnetostriction delay line whose taps are spaced from each other according to the transmitted data rate. Consequently, at one point in time each pattern or code group of signal pulses is simultaneously produced at the taps. A plurality of summing matrices properly "matched" with the various code patterns so that they can individually recognize the large number of multiple-digit code transmissions are connected between the delay-line taps and a "greatest of" detector. "Recognition" is intended to mean that of the number of different code groups or pulse digit combinations that could be transmitted, a large positive voltage value will be produced only by the summing matrix that is matched to the received information, that is, having the highest degree of correlation with the received signal, while the voltage values produced by the remaining summing matrices are near zero or even negative. The "greatest of" detector simultaneously compares all outputs from the summing matrices and determines which output is greatest, thereby unequivocally identifying the received code group. With this knowledge, the transmitted data may thereafter be reproduced.

The magnetostriction delay line is a very versatile element so that its use is of a distinct advantage. It permits, for example, a variable data rate because if the pulse code transmission is "slowed down," this simply means adjusting the taps to be farther apart. Indeed, provision for just such an adjustment is included in the present embodiment. Accordingly, this element provides a convenient means of correlating events separated in time by intervals up to several hundred microseconds. Furthermore, the magnetostriction delay line in conjunction with the summing matrices provide an extremely important characteristic of many correlation detection networks, namely, that of summing systematic events while tending to cancel random events. This last effect is obviously of primary significance because a cancellation or decrease of random noise means a lower threshold value is required for any system and, consequently, a greater communication range with a given amount of transmitter power.

It is, therefore, an object of the present invention to provide a decoder network having the characteristics of a signal correlation apparatus.

It is another object of the present invention to provide a decoder network that operates by summing systematic events while cancelling random events.

It is a further object of the present invention to provide a decoder network that makes a positive identification of a coded signal from a large number of possible coded signals.

It is an additional object of the present invention to provide a decoder network that identifies a coded signal by matching the code pattern of the signal against a built-in array of all possible code patterns that could be transmitted.

The novel features which are believed to be characteristic of the invention, both as to its organization and method of operation, together with further objects and advantages thereof, will be better understood from the following description considered in connection with the accompanying drawings in which an embodiment of the invention is illustrated by way of example. It is to be expressly understood, however, that the drawings are for the purpose of illustration and description only and are not intended as a definition of the limits of the invention.

Before proceeding to a consideration of the drawings, it would be worthwhile to mention that a 16-digit code will be used to explain the invention and that the apparatus embodying the invention has been adapted to such a coding arrangement. By a 16-digit code it is meant that each code group representing some information includes a sequence of 16 pulses. However, the particular code employed is for illustrative purposes only and other multiple-digit codes may be used just as well and the apparatus adapted to accommodate them.

Figure 1:
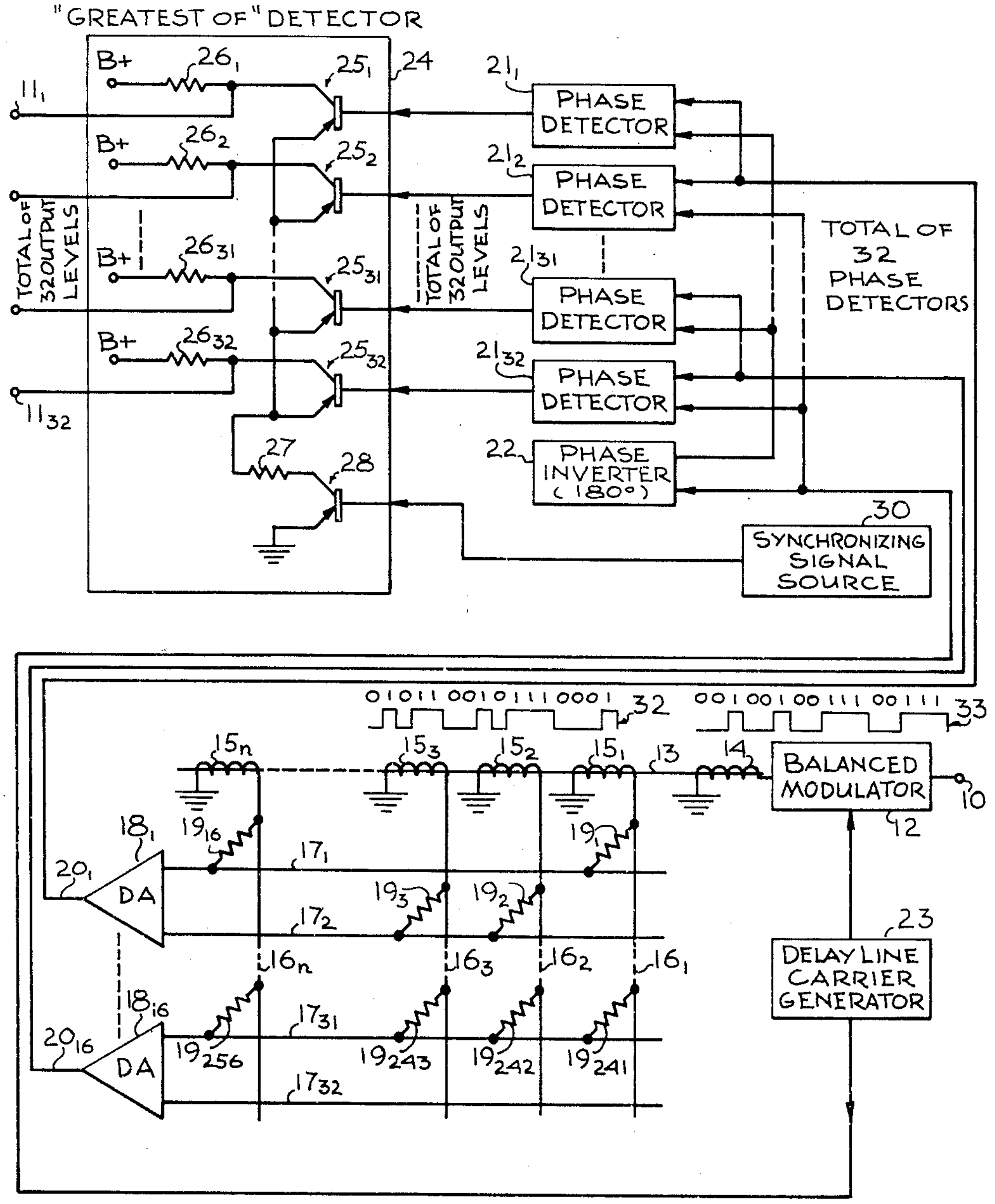
FIG. 1 is a block diagram of a preferred embodiment of a decoder network according to the present invention.

Referring now to the drawings, there is shown in FIG. 1 a decoder network which, in accordance with the present invention, positively identifies a digitally-coded signal applied to its input terminal 10 by producing a voltage at one of thirty-two output terminals $11_1$–$11_{32}$, the thirty-two output terminals respectively corresponding to thirty-two different messages or bits of information.

As shown, the network includes a balanced modulator 12 connected between input terminal 10 and a magnetostriction delay line 13 which is preferably made of a nickel alloy material. Furthermore, the delay line provides a linear input-output operating range of approximately 40 db and is usable from approximately 100 kilocycles to 1 megacycle. Stated differently, the delay line herein has linear amplitude and phase characteristics and can store information in the form of a pulse code or in the form of a carrier with sidebands.

Information is introduced into delay line 13 by means of a transducer consisting of a coil 14 wound on the basic delay line material which may be a wire or ribbon of nickel alloy. Energy is propagated down the line at the velocity of sound in the material and is absorbed in a damping device at the far end (not shown). Along the length of the line, other transducers similar to the "launch" transducer (coil 14) can recover the information, which has been delayed by a time increment determined by the physical spacing between the "launch" and "pickup" transducers. These "pickup" transducers are also coils and they are designated $15_1$–$15_n$ in the figure, where "$n$" is an integer greater than 1.

The actual value of "$n$" is determined by the number of digits in the code group and the number of different digit rates that may be employed in the communication system of which the present decoder network may be a part. Thus, for example, it was previously mentioned that the present invention would be described in connection with a 16-digit code group. Hence, the delay line apparauts of FIG. 1 would necessarily have to have 16 "pickup" coils and if more than one digit rate were involved then it would have to include considerably more than sixteen of such coils. Consequently, depending on the factors mentioned, there may be 20, 50, 80 or more "pickup" coils associated with magnetostriction delay line 13 although only a few of these are shown in FIG. 1. A more specific description of delay line 13 will be presented in FIG. 2 to be discussed later; in the meantime, information relating to magnetostriction delay lines and examples of delay lines that may be adapted for use herein may be obtained from two patents to Madison G. Nicholson, Jr., namely, Patents Numbers 2,401,094 and 2,612,603, respectively issued May 28, 1946, and September 30, 1952. Reference for this purpose may also be made to the patent to Emil Labin et al., Patent No. 2,495,740 issued January 31, 1950.

Connected to coils $15_1$–$15_n$ are $n$ electrical lines or busses $16_1$–$16_n$, one buss being connected to each coil at an end thereof, the other end of each coil being grounded. Thus, the buss designated $16_1$ is connected to an end of coil $15_1$, buss $16_2$ is connected to an end of coil $15_2$, etc., buss $16_n$ being connected to an end of coil $15_n$. Hence, busses $16_1$–$16_n$ constitute a first set of busses equal in number to the number of "pickup" coils.

A second set of 32 busses is non-conductively crossed with the first set of busses in a sort of checkerboard fashion, as shown in the figure, these busses being designated $17_1$–$17_{32}$. Thirty-two busses are included in the second set for the reason that in the particular adaptation of the embodiment being described, a coding scheme involving 16-digit code groups is used which ultimately leads to a 32-level voltage output, one voltage level for each bus. The arrangement and the reasons therefor will become clearer from the description that follows.

The 32 busses, that is, busses $17_1$–$17_{32}$, are connected to a set of 16 difference amplifiers designated $18_1$–$18_{16}$, two busses being connected to each such amplifier. Thus, busses $17_1$ and $17_2$ are connected to the two inputs of difference amplifier $18_1$, busses $17_3$ and $17_4$ are connected to the two inputs of difference amplifier $18_2$, etc., busses $17_{31}$ and $17_{32}$ being connected to the two inputs of difference amplifier $18_{16}$. For sake of clarity, however, only two difference amplifiers are shown in the figure, namely, difference amplifiers $18_1$ and $18_{16}$. The output lines from the difference amplifiers also number sixteen and are designated $20_1$–$20_{16}$. Here again, for sake of clarity, only two such output lines are shown, namely, lines $20_1$ and $20_{16}$ from difference amplifiers $18_1$ and $18_{16}$, respectively. Particular information concerning the construction and operation of difference amplifiers of the type that may be used herein may be had by referring to pages 113–117 of the book entitled "Electron-Tube Circuits," authored by Samuel Seely, and published in 1950 by the McGraw-Hill Book Company, Inc., of New York.

A plurality of resistors $19_1$–$19_m$, where, it will be seen later, $m$ is 256, are connected between the two sets of busses at selected points of intersection, the points of intersection being chosen in such a manner that as many different connection patterns are formed as there are different code groups utilized to represent the different bits of information. Stated differently, the resistors interconnect the two sets of busses in such a manner that a maximum signal will appear at the output of a difference amplifier when complete correlation exists between an input code or pulse group and the matched decoder matrix formed by the delay line taps, the two busses leading in to this difference amplifier and the resistors interconnecting said taps and busses.

Looking to FIG. 1 it will be seen that busses $16_1$–$16_{16}$, busses $17_1$ and $17_2$, and the resistors interconnecting busses $16_1$–$16_{16}$ with busses $17_1$ and $17_2$ constitute one matched filter in the decoder network. Similarly, busses $16_1$–$16_{16}$, busses $17_3$ and $17_4$, and the resistors interconnecting busses $16_1$–$16_{16}$ with busses $17_3$ and $17_4$ constitute another matched filter, etc., the resistors interconnecting busses $16_1$–$16_{16}$ with busses $17_{31}$ and $17_{32}$ constituting the sixteenth and, therefore, the last matched filter in the decoder network. Hence, for each group of 16 pickup coils corresponding to a particular data rate, there is an associated group of 16 matched filters. Only some of the total number of resistors forming the many matched filters of the decoder are shown in FIG. 1 for sake of clarity and simplicity but it will be obvious that 256 resistors are required for each set of 16 matched filters servicing a particular data rate. In other words, 256 resistors interconnect busses $16_1$–$16_{16}$ with busses $17_1$–$17_{32}$ to handle the 16-digit code groups at coils $15_1$–$15_{16}$. Similarly, 256 resistors are necessary for each of the other groups of 16 coils corresponding to a data rate. It should be mentioned that 256 resistors are required because a 16-digit code group is used herein but that a code scheme using a code group having a different number of digits therein would require a different amount of resistors for each data rate.

It should further be mentioned here that each group of 16 pickup coils corresponding to a data rate is selectively connected to its associated group of 16 matched filters through a switch apparatus so that when a particular data rate is being used, only the associated group of 16 coils and 16 matched filters are connected to each other in the decoder. The other groups of coils corresponding to data rates other than the one in use are disconnected from the matched filters by this switch apparatus. Here again, to avoid encumbering the drawing and, therefore, to avoid confusion, the switch apparatus has been omitted from FIG. 1. However, it is included in FIG. 2 and will be more specifically discussed later.

The decoder network of FIG. 1 further includes a plurality of phase detectors $21_1$–$21_{32}$ which are connected to difference amplifiers $18_1$–$18_{16}$, a pair of phase detectors being connected to each difference amplifier. More particularly, difference amplifier $18_1$ is connected to one of two inputs to each of phase detectors $21_1$ and $21_2$, difference amplifier $18_2$ is connected to one of two inputs to each of phase detectors $21_3$ and $21_4$, etc., difference amplifier $18_{16}$ being connected to one of two inputs to each of phase detectors $21_{31}$ and $21_{32}$. Also connected to phase detectors $21_1$–$21_{32}$, at their other inputs, are the input and output ends of a phase inverter 22, the input end of the phase inverter being connected to a delay line carrier generator 23 which is also connected to balanced modulator 12. Furthermore, the input end of phase inverter 22 is connected to all the even-numbered phase detectors, such as phase detectors $21_2$, $21_4$, $21_6$, etc. whereas the output end of the phase inverter is connected to all the odd-numbered phase detectors, such as phase detectors $21_1$, $21_3$, $21_5$, etc.

Phase detectors $21_1$–$21_{32}$ are coupled at their output ends to what has been termed herein as a "greatest of" detector. This detector is designated 24 in the figure and its function, basically, is to determine which of the phase detectors is producing the greatest output signal. For this purpose, "greatest of" detector 24 includes a plurality of transistors, namely, one for each phase detector. Accordingly, thirty-two transistors are included herein, the transistors being generally designated $25_1$–$25_{32}$. The base elements of transistors $25_1$–$25_{32}$ are respectively connected to the output ends of phase detectors $21_1$–$21_{32}$. The collector elements of these transistors, on the other hand, are respectively connected through a plurality of resistors $26_1$–$26_{32}$ to a source of voltage designated B+. As for the emitter elements, these are all electrically tied to the same end of a resistor 27 whose other end is connected to the collector element of an additional transistor generally designated 28. The emitter element of transistor 28 is grounded and its base element is connected to a synchronizing signal source 30. Finally, there are thirty-two output connections from "greatest of" detector 24, one from the collector element of each of transistors $25_1$–$25_{32}$, and these thirty-two outputs are respectively connected to decoder output terminals $11_1$–$11_{32}$.

Figure 2:
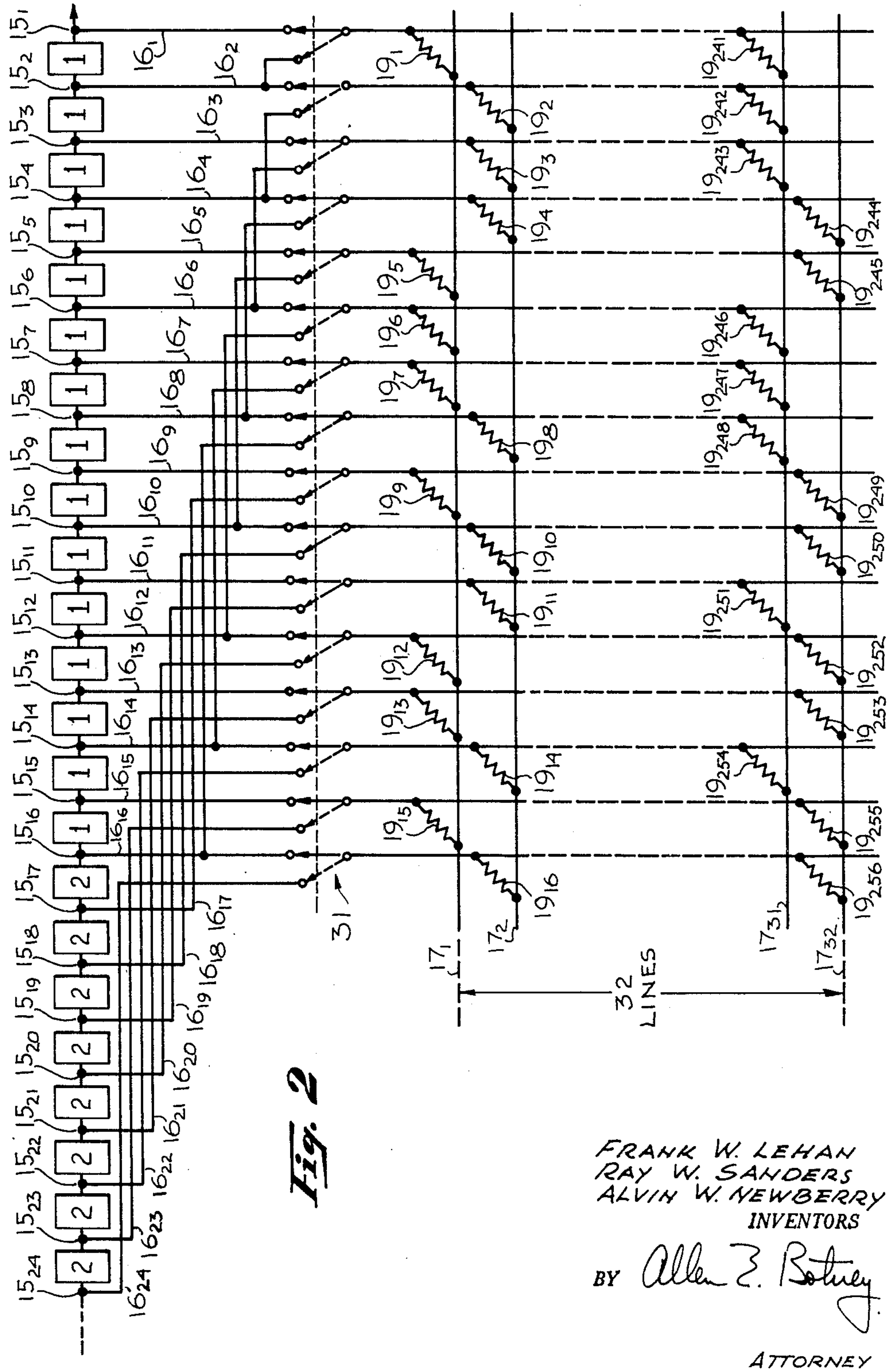
FIG. 2 is a schematic representation of the magnetostriction delay line and summing matrices included in the network of FIG. 1.

Proceeding now to a more detailed consideration of magnetostriction delay line 13, busses $16_1$–$16_n$, busses $17_1$–$17_{32}$, resistors $19_1$–$19_m$ and the switch apparatus for connecting a particular set of "pickup" coils on the delay line to the resistor matrices constituting the matched filters, reference is now made to FIG. 2 wherein this combination of elements is more fully illustrated than in FIG. 1. It should be mentioned first, however, that only that portion of the delay line and its related circuitry is shown in FIG. 2 that is designed to accommodate two digit or data transmission rates. It was felt that this would be a sufficient showing to adequately explain the construction and operation of this combination so that, if need be, one could easily extend this equipment for additiitional data rates. It should also be noted here that the numerals 1 and 2 in the blocks merely represent intervals or periods of delay between "pickup" coils on the delay line and do not designate any devices. Thus, if the "1" represents a predetermined unit interval of delay between adjacent coils, the "2" represents two such units of delay between adjacent coils. As for the coils themselves, they are represented by dots in FIG. 2 but are designated as in FIG. 1.

To accommodate a first transmission rate for a coding scheme using 16-digit code groups to represent the information transmitted, magnetostriction delay line 13 has sixteen coils mounted on it, namely, coils $15_1$–$15_{16}$, the coils being spaced from each other along the delay line to produce unit intervals of time delay between adjacent coils. Coils $15_1$–$15_{16}$ are respectively connected via busses $16_1$–$16_{16}$ through a multi-terminal switch 31 to resistors $19_1$–$19_{256}$ which are arranged to form 32 "matched" filters, that is, the resistors are arranged in patterns like the pulse patterns by which the data is transmitted. Resistors $19_1$–$19_{16}$ form the first such resistor arrangement whereas resistors $19_{241}$–$19_{256}$ form the last resistor arrangement, the resistor arrangements between these two being omitted for sake of simplicity. The significance of these "matched" filters or resistor arrangements will be more fully understood from the description of the operation presented below. Resistors $19_1$–$19_{256}$ interconnect busses $16_1$–$16_{16}$ to busses $17_1$–$17_{32}$, as shown in the figure, the latter busses making connection with difference amplifiers $18_1$–$18_{16}$ in the manner previously described.

To accommodate a second transmission rate which, for purposes of illustration herein, has half the data rate of the first transmission rate, an additional number of "pickup" coils are mounted on the delay line. However, in order to minimize the total number of coils and still provide for the second transmission rate, eight of the first sixteen coils are used, namely, coils $15_2$, $15_4$, $15_6$, $15_8$, $15_{10}$, $15_{12}$, $15_{14}$, $15_{16}$, followed by eight coils, namely, coils $15_{17}$–$15_{24}$, that are spaced from each other by two units of time delay. Coupling of this second set of coils to the resistor matrices or, stated differently, to the matched filters, is accomplished by means of switch mechanism 31, as indicated in the figure.

It will be recognized that still other data transmission rates may be accommodated by mounting an additional group of eight coils on delay line 13 for each new data rate and combining it with the previously mounted coils exactly in the manner related. Thus, for example, a third data rate having half the data rate of the second transmission rate and one fourth the data rate of the first transmission rate may be provided for by using coils $15_4$, $15_8$, $15_{16}$, $15_{18}$, $15_{20}$, $15_{22}$, $15_{24}$ and adding eight new coils spaced apart by four units of time delay.

Having completed a detailed description of the manner in which the present invention may be embodied, consideration will now be given to its operation. Accordingly, 16-digit code groups representing different bits of information are successively applied to input terminal 10 in FIG. 1. These code groups are differently arranged pulse sequences, two such code groups being shown in FIG. 1 and respectively designated 32 and 33. Pulse groups 32 and 33 will hereinafter be used to specifically describe the operation.

Thus, when a code group, such as pulse sequence 32, is applied to input terminal 10 balanced modulator 12 to which is also applied a local carrier signal produced by carrier generator 23, the carrier frequency being adjusted to provide a time period between successive zero crossings equal to an even submultiple of the delay time between adjacent taps or coils on the delay line. In response to both signals, a two-phase carrier signal is produced by balanced modulator 12, one phase representing a "1" or "plus" condition and the other phase representing a "0" or "minus" condition. Stated differently, one phase represents the presence of a pulse while the other phase represents the absence of a pulse. The two phases preferably differ from each other by 180°. For further information concerning the operation of balanced modulators, reference is made to "Electronic Circuits and Tubes," Cruft Laboratory, McGraw-Hill, Inc., 1947, pages 660–661.

The carrier as modulated by the code group waveform, pulse waveform 32 for example, is applied to delay line 13 via coil 14 and is propagated down it. When complete correlation exists between the input code group and its matched filter, then a maximum signal will appear at the associated difference amplifier. In other words, the modulated local carrier is propagated down delay line 13, the moment of greatest interest being that moment when the portion of the carrier modulated by the input code group is in alignment or in registration with coils $15_1$–$16_{16}$. When this occurs, signals of one phase or the other, or both, will appear on busses $17_1$–$17_{32}$ so that signals of different magnitude will respectively be produced by difference amplifiers $18_1$–$18_{16}$. The reason for the different magnitudes of the amplifier outputs is that only at one pair of busses are the signals all of one phase on one buss and all of the other phase on the other buss. On all other busses, the signals thereon are of both phases with the result that signal cancellation takes place, thereby reducing the carrier output of the associated difference amplifiers.

Considering the code group of pulse waveform 32, if the "0" conditions of the waveform correspond to one phase of the local carrier and the "1" conditions correspond to the other phase thereof, it will be obvious to anyone skilled in the art that at one point in time the "0" portions of the modulated carrier will simultaneously be produced by coils $15_{16}$, $15_{14}$, $15_{11}$, $15_{10}$, $15_8$, $15_4$, $15_3$ and $15_2$ and that, at the same time, the "1" portions of the modulated carrier will simultaneously be produced by coils $15_{15}$, $15_{13}$, $15_{12}$, $15_9$, $15_7$, $15_6$, $15_5$ and $15_1$. As a result, the signals respectively produced across resistors $19_{16}$, $19_{14}$, $19_{11}$, $19_{10}$, $19_8$, $19_4$, $19_3$ and $19_2$ and, therefore, applied to buss $17_1$ will all be of one phase and the signals respectively produced across resistors $19_{15}$, $19_{13}$, $19_{12}$, $19_9$, $19_7$, $19_6$, $19_5$ and $19_1$ and, therefore, applied to buss $17_2$ will all be of the other phase. On each of busses $17_3$–$17_{32}$, however, the signals will not all be of the same phase but rather of both and, since the two phases are 180° apart, some signal cancellation will take place. Hence, while signals of both phases are applied to difference amplifiers $18_1$–$18_{16}$, it will be apparent from what has been said that amplifier $18_1$ will receive maximum signals in response to pulse pattern 32.

Each one of difference amplifiers $18_1$–$18_{16}$ subtracts one of its input signals from the other of its input signals to produce a single output signal having the phase of the minuend signal, whichever one of the two phases it may be. With respect to waveform 32, it will be apparent here too that since the maximum input signals are applied to difference amplifier $18_1$ that amplifier $18_1$ will produce the output signal of maximum amplitude. Hence, while amplifiers $18_1$–$18_{16}$ respectively produce sixteen output signals having either of the two phases, one amplifier produces a maximum signal. In the case of waveform 32, it is amplifier $18_1$ for the reasons stated above.

Difference amplifiers $18_1$–$18_{16}$ respectively apply their carrier outputs of varying amplitude and phase to phase detectors $21_1$–$21_{32}$, the output from each amplifier being applied to a pair of detectors. Thus, the output from difference amplifier $18_1$ is applied via line $20_1$ to phase detectors $21_1$ and $21_2$, the output from difference amplifier $18_2$ is applied via line $20_2$ to phase detectors $21_3$ and $21_4$, etc., the output from difference amplifier $18_{16}$ being applied via line $20_{16}$ to phase detectors $21_{31}$ and $21_{32}$. In addition, one of each pair of phase detectors is driven by the in-phase component of the carrier out of carrier generator 23 while the other phase detector of each pair is driven by the 180° out-of-phase component. In FIG. 1, the in-phase component is applied to all the even-numbered phase detectors, such as $21_2$, $21_4$, etc., whereas the 180° out-of-phase component is applied to all the odd-numbered phase detectors, such as $21_1$, $21_3$, etc. The 180° out-of-phase component is obtained by first passing the carrier through phase inverter 22 before applying it to the detectors. From what has been said it will be obvious to one skilled in the art that the output from only one of the phase detectors will have a large positive D.C. value while the remaining outputs are near zero or even negative. Where pulse sequence 32 is the input code group, phase detector $21_1$ may be considered as producing the signal having the greatest positive value.

The thirty-two outputs from phase detectors $21_1$–$21_{32}$ are respectively applied to transistors $25_1$–$25_{32}$ in "greatest of" detector 24. At the same time, an enabling pulse produced by synchronizing signal source 30 is applied to transistor 28 therein, thereby allowing transistors $25_1$–$25_{32}$ to compare the amplitudes of the phase detector outputs and, in essence, select or identify the output having the largest amplitude. The action of transistors $25_1$–$25_{32}$ is such that current will flow through resistor 27 from only one of these transistors, that being the one with the greatest input voltage. All other transistors are back-biased by the voltage drop across resistor 27 due to current flow through the one transistor which has had the greatest voltage generated in its input circuit. Again using pulse pattern 32 illustratively, transistors $25_2$–$25_{32}$ are back-biased whereas transistor $25_1$ remains forward biased and current conducting. In consequence thereof, all but one of output terminals $11_1$–$11_{32}$ are at the same voltage level, the exception being at a different level. The terminal that is the exception is the one connected to the current-conducting transistor, which would be terminal $11_1$ in the illustration. It is thus seen that a positive identification is made of each input code group representing data, the identification being of code group 32 in the present instance.

Having described the evolution and processing of a coded signal, in particular signal 32, through the decoder network, attention is now directed to a second coded signal which may follow the first, such as signal 33 in FIG. 1. However, a detailed description with respect to waveform 33 is deemed unnecessary in view of the fact that the processing of this signal is substantially identical to that of signal 32. Suffice it to say, therefore, that in response to the pulse pattern of signal 33, the matched filter comprising resistors $19_{241}$–$19_{256}$ produces the largest signals at busses $17_{31}$ and $17_{32}$ and that, in consequence thereof, difference amplifier $18_{16}$ produces the largest single output signal of all the difference amplifiers. Depending upon which of the two phases is the prevailing one at the output of amplifier $18_{16}$, either phase detector $21_{31}$ or phase detector $21_{32}$ will produce the largest value of positive voltage with the result that the identifying or recognition voltage will be respectively produced at either output terminal $11_{31}$ or output terminal $11_{32}$.

In the same manner that identification was made for coded signals 32 and 33, still other code groups to follow representing still other bits of data will also be identified.

In the event that the received code groups have digit rates other than heretofore described, then it is only necessary to adjust switch mechanism 31 until the proper set of "pickup" coils, that is, until the set of "pickup" coils having time delays therebetween corresponding to the digit rate, are connected to the "matched" filters. The results thereafter, however, would be exactly the same as previously described. Thus, by way of example, if the digit rates of signals 32 and 33 were one-half what they were previously, then switch mechanism 31 would be used to connect coils $15_2$, $15_4$, $15_6$, $15_8$, $15_{10}$, $15_{12}$, $15_{14}$, $15_{16}$ and coils $15_{17}$–$15_{24}$ to resistors $19_1$–$19_{256}$. The processing of these signals would then be as already delineated.

It should be noted that a 16-digit code group, which may be obtained, for example, from the Reed-Muller or Barker codes, was used herein only illustratively and that the present invention may be used as well with other types of codes as, for example, one using a 6-digit code group. In the latter instance, the present invention need only be adapted according to the number of digits in a code group. Thus, for a 6-digit code group, only 6 "pickup" coils would be required for each data rate instead of the 16 coils required in the adaptation described. The remaining circuitry would be correspondingly reduced in number as well.

It should also be mentioned that instead of applying a carrier modulated by the binary-coded signals to the delay line, the binary-coded signals may, by slightly simplifying the network, be applied directly to the delay line. Thus, the binary-coded signals may be processed without the aid of a carrier by taking the carrier generator, the balanced modulator and the phase detectors out of the network and connecting the "greatest of" detector directly to the difference amplifiers. Furthermore, although the invention was described in connection with binary-coded signals, it will be recognized by those skilled in the art that signals of more than two voltage levels may be utilized as well, that is to say, amplitude-coded signals may be used with equally good effect. This may be done by appropriately "weighting" the resistors in the correlation detectors or, stated differently, by assigning values of resistance to these resistors such that the signals applied to the two inputs of each difference amplifier are substantially of the same amplitude.

Finally, it should be mentioned that at times the "greatest of" detector may be replaced with very good advantage by a plurality of threshold circuits connected in tandem. By making a substitution of the kind indicated, it then becomes possible to determine with a relatively high degree of accuracy whether the identification made of a received coded signal is an accurate one, that is to say, the threshold circuits provide an indication of the probability that an identification, once made, is an accurate identification. This will become clearer later.

Figure 3A:
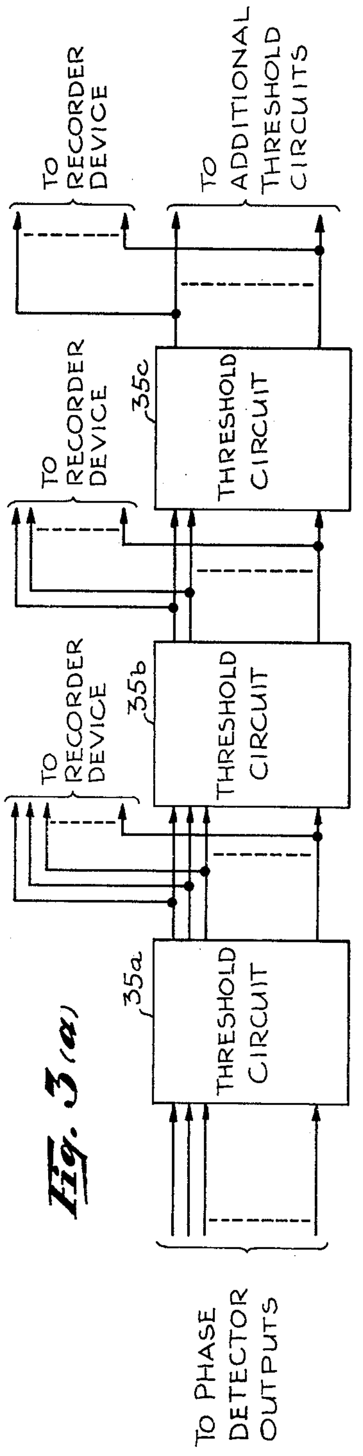
FIGS. 3*a* and 3*b* illustrate a possible modification of the FIG. 1 network.

In order to more specifically explain how and why a plurality of threshold circuits would be substituted for the "greatest of" detector, reference is made to FIG. 3*a* wherein a number of such threshold circuits are shown. For sake of simplicity, however, only three such circuits are shown in the figure, designated 35*a*, 35*b* and 35*c*. Accordingly, it is to be understood that the three threshold circuits shown are representative only and that fewer or more than three may be utilized as needed or desired.

The plurality of threshold circuits are connected in tandem, the first circuit, circuit 35*a*, being connected to phase detectors $21_1$–$21_{32}$. Furthermore, as may be seen from the figure, the output lines from each threshold circuit are tapped and by means of these taps they are respectively coupled to a multi-channel recording device, such as a tape recorder. Since recording devices of the type mentioned are well known in the art, it is not deemed necessary to illustrate them in the figure. It will be recognized that since there are a total of thirty-two output lines from the phase detectors, each of the threshold circuits correspondingly has thirty-two input and thirty-two output lines. Accordingly, it will easily be surmised from what has been said that thirty-two recording channels are required for each of the recording devices. Of course, if a different number of phase detectors were involved, then the number of output lines and recording channels would be similarly different. Finally, it should be stated that the threshold circuits are respectively biased to different threshold voltage levels for reasons that will be more clearly understood later.

Figure 3B:
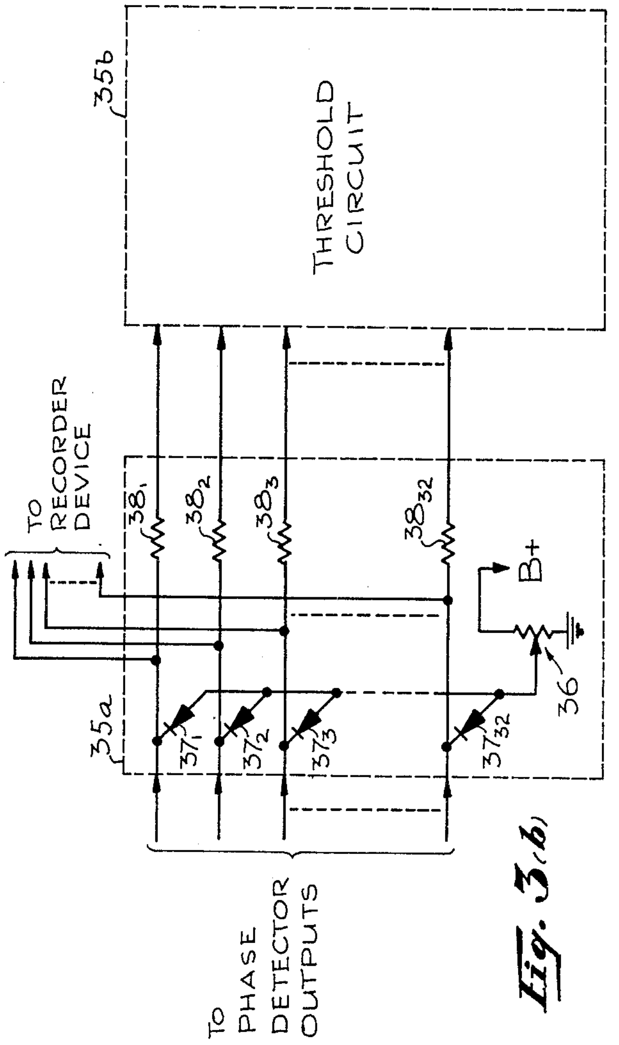

The internal arrangement of a threshold circuit, circuit 35*a* for example, is shown in FIG. 3*b* and, as shown therein, includes a plurality of diodes respectively connected between the plurality of phase detector outputs and a source of positive voltage, generally designated 36, for biasing the diodes to some determined threshold value. In view of the fact that there are thirty-two outputs from phase detectors $21_1$–$21_{32}$, threshold circuit 35*a* therefore includes thirty-two diodes and these are designated $37_1$–$37_{32}$. Diodes $37_1$–$37_{32}$ are connected so that their anodes are connected to voltage source 36 and their cathodes respectively connected to the phase-detector outputs. Also included are a plurality of thirty-two resistors $38_1$–$38_{32}$ which act both as load as well as isolating resistors, one resistor being inserted in each of the output lines as shown. As suggested before, if a different number of phase detectors were used, then a correspondingly different number of output lines would be required, with the result that different numbers of diodes and resistors would be included in the circuit. The other threshold circuits in the series are identical to circuit 35*a* just described and, hence, need not be delineated in detail.

In operation, the threshold levels for the different circuits are respectively different, with the level for any one circuit being higher than that for the preceding circuit. Thus, circuit 35*a* has the smallest threshold value, circuit 35*b* the next higher value, etc., the last threshold circuit in the series having the highest threshold level. Furthermore, the diodes are forward-biased so that the diodes in each circuit provide shorted paths between their respective output lines and the associated voltage source. In other words, the diodes shunt the lines through low impedances to ground and thereby prevent signals from getting through if the amplitudes of these signals are less than the threshold levels. On the other hand, if any of the signals appearing on the lines of a circuit exceed the threshold voltage thereon, then the diodes associated with those lines will become back-biased and the signals will pass through to the next circuit. For example, if the output voltage produced by phase detector $21_2$ is less than the threshold voltage applied to diode $37_2$, then that phase-detector output will be shunted out by the diode and will not pass through to circuit 35*b*. On the other hand, if the voltage out of phase detector $21_2$ is greater than the bias on diode $37_2$, then a signal will be developed across resistor $38_2$. This signal will be applied to circuit 35*b* where it will be subjected to similar conditions and will be applied also to a recorder where it will be permanently recorded in one of the channels thereon.

The description of the operation just described is the same for each of the circuits and, hence, need not be repeated. The only exception, of course, is that in each succeeding circuit the threshold level is higher so that fewer signals will pass through as may be expected.

The advantage of these circuits over the "greatest of" detector is that in the event a signal does ultimately appear at the output of the last stage, one can be reasonably certain that the output signal does indeed correspond to the data signal originally applied to the decoder network. Stated differently, if a final output signal is developed, then the probability that it is an accurate or correct output is high. On the other hand, if error exists or if doubt exists as to accuracy, the threshold circuits provide an opportunity to locate the point of error or to dispel the doubt. This may be done by referring to the signals recorded by the recording devices. Thus, by way of example, if signals were recorded in two channels of a recorder, let us say the recording apparatus associated with the next-to-the last threshold circuit, the coded signals associated with the two recorded signals could be compared and their dissimilarities noted. The dissimilarities indicate possible errors. Thus, if one recorded signal corresponds to a 5-digit binary-coded signal 10111 and the other corresponds to a 5-digit binary-coded signal 10011, confidence may then be had in the accuracy of all the digits except one, namely, the third digit from the left and this inconsistency may possibly be resolved by similarly considering previous recordings.

It will be obvious to those skilled in the art that similarly operating thereshold circuits may be obtained by inverting the diode connections, that is, by connecting the anodes to the circuit lines and the cathodes to the source of positive voltage.

It should also be emphasized here that although the "greatest of" detector, delay line apparatus and threshold circuits have been described in connection with their use in a decoder, these subcombinations may be used to good effect and advantage elsewhere.

Having thus described the invention, what is claimed as new is:

1. A decoder network for producing an output voltage identifying a binary-coded signal, representing a bit of information, applied thereto, said decoder network comprising: a signal generator for generating a carrier signal at a predetermined frequency; a balanced modulator receptive of the binary-coded signal and coupled to said generator for receiving said carrier signal, said modulator modulating said carrier signal in such a manner with the binary-coded signal as to produce a bi-phased carrier signal, one phase corresponding to one voltage level of the binary-coded signal and the other phase corresponding to the other voltage level of the binary-coded signal; multi-tapped delay means receptive of said modulated carrier signal and adapted to simultaneously and respectively produce the phased portions of said modulated carrier at a plurality of taps; correlation means coupled to said delay means at the taps thereof for combining said phased portions in such a manner as to simultaneously produce a plurality of voltage levels of different amplitude, each voltage level corresponding to a different coding sequence for the biary-coded signal, the voltage level of greatest magnitude corresponding to the coding sequence of the signal applied to the decoder network; and output means coupled to said correlation means for comparing said plurality of voltage levels, said output means including a plurality of output terminals, one for each of said voltage levels, and operable in response to said comparison to produce an output voltage only at the output terminal corresponding to the voltage level having the greatest amplitude, thereby to identify the applied binary-coded signal.

2. The decoder network defined in claim 1 wherein said output means includes a plurality of electrical circuits respectively receptive of the voltage levels and operable to sample them, and an output load circuit connected to each of said electrical circuits, each of said electrical circuits normally being forward-biased and operable in response to a voltage level of maximum amplitude applied thereto to produce a current flow therethrough that produces a distinct output voltage that identifies the binary-coded signal, said current also flowing through said output load circuit to develop a biasing voltage therein that back-biases the other of said electrical circuits, whereby output voltages are not produced by said other electrical circuits.

3. The decoder network defined in claim 2 wherein each of said electrical circuits includes a transistor and a resistor, said plurality of transistor base elements respectively being receptive of the plurality of voltage levels and said plurality of transistor emitter elements being connected to said output load circuit, said plurality of resistors being respectively connected between said plurality of transistor collector elements and a source of potential.

4. A decoder network for producing an output voltage identifying each binary-coded signal, representing a bit of information, applied thereto, said decoder network comprising: a signal generator for generating a carrier signal at a predetermined frequency; a balanced modulator receptive of the binary-coded signal and coupled to said generator for receiving said carrier signal, said modulator modulating said carrier signal in such a manner with the binary-coded signal as to produce a bi-phased carrier signal, one phase corresponding to one voltage level of the binary-coded signal and the other phase corresponding to the other voltage level of the binary-coded signal; multi-tapped delay means receptive of said modulated carrier signal and adapted to simultaneously and respectively produce the phased portions of said modulated carrier at a plurality of its taps; a plurality of correlation detectors, equal in number to the plurality of differently binary-coded signals, coupled to the taps of said delay means to receive the simultaneously produced phased portions of said modulated carrier, said plurality of detectors adding and subtracting said phased portions of the carrier in such a manner as to simultaneously produce a corresponding plurality of phased carrier portions of different magnitude, the detector establishing the highest degree of correlation with the first-mentioned phased carrier portions producing the output portion of maximum magntiude; a phase inverter circuit coupled to said signal generator for inverting said carrier signal; phase-detector means coupled to said signal generator, phase inverter and plurality of correlation detectors for comparing the phased carrier portions out of said correlation detectors with the carrier out of said signal generator and the inverted carrier out of said phase inverter to respectively produce a plurality of voltage levels of different amplitude at a plurality of output terminals thereof, the output terminal having the voltage level of maximum amplitude thereat corresponding to the correlation detector whereat the phased carrier portion is of maximum magnitude; and output means coupled to said phase detector means and including a plurality of output terminals respectively corresponding to the output terminals of said phase-detector means, said output means comparing said plurality of voltage levels and, in response to said comparison, producing an output voltage only at the output terminal thereof that corresponds to the output terminal of the phase detector means whereat the voltage level is of maximum amplitude, thereby to identify the applied binary-coded signal.

5. The decoder network defined in claim 4 wherein said plurality of correlation detectors respectively include a resistor matrix associated with a predetermined one of the binary-coded signals and arranged as first and second groups of resistors, the number of resistors in said matrix being equal to the number of digits in a binary-coded signal, the resistors of said first group being equal in number of the number of digits at one voltage level in the associated signal and connected to said delay means in such a manner that when all the carrier phased portions are simultaneously produced by said delay means, the phased carrier portions of said one phase are respectively produced across said first group of resistors, the resistors of said second group being equal in number to the number of digits in the associated signal at the other voltage level and connected to said delay means in such a manner that when all the phased carrier portions are simultaneously produced by said delay means, the phased carrier portions of said other phase are respectively produced across said second group of resistors; and a plurality of difference amplifiers respectively having first and second inputs, one difference amplifier for each resistor matrix, the first and second inputs thereof being connected to the first and second groups of resistors, respectively, of the associated resistor matrix, whereby said phased carrier portions are added and subtracted.

6. The decoder network defined in claim 4 wherein said output means includes a plurality of electrical circuits respectively connected to the plurality of output terminals of said phase-detector means and an output load circuit connected to each of said electrical circuits, each of said electrical circuits normally being forward-biased and operable in response to a voltage level of maximum amplitude to produce a current flow therethrough that establishes said output voltage at the associated output terminal, said current also flowing through said output load circuit to develop a biasing voltage therein that back-biases the other electrical circuits, whereby output voltages are not established at the output terminals of said other electrical circuits.

7. The decoder network defined in claim 6 wherein each of said electrical circuits includes a transistor and a resistor, said plurality of transistor base elements being respectively connected to the plurality of output terminals of said phase-detector means and said plurality of transistor emitter elements being connected to said output load circuit, said plurality of resistors being respectively connected between said plurality of transistor collector elements and a source of potential, said plurality of collector elements being respectively connected to the associated plurality of output terminals.

8. A decoder network for producing an output voltage identifying each binary-coded signal, representing a bit of information, applied thereto, said decoder network comprising: a signal generator for generating a carrier signal at a predetermined frequency; a balanced modulator receptive of the binary-coded signal and coupled to said generator for receiving said carrier signal, said modulator modulating said carrier signal in such a manner with the binary-coded signal as to produce a bi-phased carrier signal, one phase corresponding to one voltage level of the binary-coded signal and the other phase corresponding to the other voltage level of the binary-coded signal; multi-tapped delay means receptive of said modulated carrier signal and adapted to simultaneously and respectively produce the phased portions of said modulated carrier at a plurality of its taps; a plurality of resistor matrices, equal in number to the plurality of differently binary-coded signals, coupled to the taps of said delay means to receive the simultaneuosly produced phased portions of said modulated carrier; each matrix being associated with a predetermined one of the binary-coded signals and arranged as first and second groups of resistors, the number of resistors in said matrix being equal to the number of digits in a binary-coded signal, the resistors of said first group being equal in number to the number of digits at one voltage level in the associated signal and connected to said delay means in such a manner that when all the phased carrier portions are simultaneously produced by said delay means, the phased carrier portions of said one phase are respectively produced across said first group of resistors, the resistors of said second group being equal in number to the number of digits in the associated signal at the other voltage level and connected to said delay means in such a manner that when all the phased carrier portions are simultaneously produced by said delay means, the phased carrier portions of said other phase are respectively produced across said second group of resistors; a plurality of difference amplifiers respectively having first and second inputs, one difference amplifier for each resistor matrix, the first and second inputs thereof being connected to the first and second groups of resistors, respectively, of the associated resistor matrix, said plurality of difference amplifiers respectively subtracting the signals of said other phase produced across the associated second group of resistors from the signals of said one phase produced across the associated first group of resistors to produce a corresponding plurality of phased output signals having different amplitudes, the difference amplifier connected to the resistor matrix having the greatest degree of correlation with the phased carrier portions simultaneously produced by said delay means producing the phased output signal of maximum amplitude; a phase-inverter circuit coupled to said signal generator for inverting said carrier signal; phase-detector means coupled to said signal generator, phase inverter and plurality of difference amplifiers for comparing said phased output signals with said carrier and inverted carrier signals to respectively produce a plurality of voltage levels of different amplitude at a plurality of output terminals thereof, the output terminal having the voltage level of maximum amplitude thereat corresponding to the difference amplifier whereat the phased output signal is of maximum amplitude; and a plurality of electrical circuits respectively connected to the plurality of output terminals of said phase detector means and an output load circuit connected to each of said electrical circuits, each of said electrical circuits normally being forward-biased and operable in response to a voltage level of maximum amplitude to produce a current flow therethrough that establishes an output voltage at its output terminal, said current also flowing through said output load circuit to develop a biasing voltage therein that back-biases the other electrical circuits, whereby output voltages are not established at the output terminals of said other electrical circuits.

9. The decoder nework defined in claim 8 wherein said plurality of electrical circuits respectively include a transistor and a resistor, the base elements of said transistors being respectively connected to the plurality of output terminals of said phase-detector means and the emitter elements thereof being connected to said output load circuit, said plurality of resistors being respectively connected between said plurality transistor collector elements and a source of potential, said plurality of collector elements being respectively connected to the associated plurality of output terminals.

10. The decoder network defined in claim 8 wherein said delay means is a magnetostriction delay line having an input coil for applying said modulated carrier signal thereto and a plurality of output coils at least equal in number to the number of digits in the binary-coded signals, said coils being spaced along said delay line in accordance with the digit rate of the coded signals.

11. The decoder network defined in claim 8 wherein said delay means includes a magnetostriction delay line having a plurality of interleaved sets of pickup coils mounted thereon, the number of said sets being equal to the number of possible digit rates for the binary-coded signals, the number of coils in each set being equal to the number of digits in the binary-coded signal and spaced along said delay line in accordance with the associated digit rate; and a switch mechanism for selectively connecting one of said sets of coils to said plurality of resistor matrices.

12. A decoder network for producing an output voltage identifying each binary-coded signal, representing a bit of information, applied thereto, said decoder network comprising: a signal generator for generating a carrier signal at a predetermined frequency; a balanced modulator receptive of the binary-coded signal and coupled to said generator for receiving said carrier signal, said modulator modulating said carrier signal in such a manner with the binary-coded signal as to produce a bi-phased carrier signal, one phase corresponding to one voltage level of the binary-coded signal and the other phase corresponding to the other voltage level of the binary-coded signal; multi-tapped delay means receptive of said modulated carrier signal and adapted to simultaneously and respectively produce the phased portions of said modulated carrier at a plurality of its taps; a plurality of correlation detectors, equal in number to the plurality of differently binary-coded signals, coupled to the taps of said delay means to receive the simultaneously produced phased portions of said modulated carrier, said plurality of detectors adding and subtracting said phase portions of the carrier in such a manner as to simultaneously produce a corresponding plurality of phased carrier portions of different magnitude, the detector establishing the highest degree of correlation with the first-mentioned phased carrier portions producing the output portion of maximum magnitude; a phase inverter circuit coupled to said signal generator for inverting said carrier signal; phase-detector means coupled to said signal generator, phase inverter and plurality of correlation detectors for comparing the phased carrier portions out of said correlation detectors with the carrier out of said signal generator and the inverted carrier out of said phase inverter to respectively produce a plurality of voltage levels of different amplitude at a plurality of output terminals thereof, the output terminal having the voltage level of maximum amplitude thereat corresponding to the correlation detector whereat the phased carrier portion is of maximum magnitude; and a plurality of threshold circuit networks connected in tandem, each threshold network being biased at a higher threshold level than the next preceding one and including as many threshold circuits as voltage levels produced by said phase-detector means, the threshold circuits of the first of said tandem-connected networks being respectively coupled to the output terminals of said phase-detector means to receive the voltage levels therefrom, the threshold circuits of each threshold network receiving only those voltage levels that are passed by the threshold circuits of the next preceding threshold network and adapted to pass only those of said received voltage levels that exceed the threshold level to which that threshold network is biased.

13. A decoder network for producing an identifying output signal for each of a plurality of coded signals, respectively representing bits of information, applied thereto, said decoder network comprising: delay means receptive of a coded signal and operable in response thereto to simultaneously produce the digit voltage levels thereof; a plurality of correlation detectors, equal in number to the plurality of differently coded signals, connected to said delay means to receive said simultaneously produced voltage levels, said plurality of detectors adding and subtracting said voltage levels in such a manner as to simultaneously produce a corresponding plurality of resultant voltage levels of different amplitude, the detector establishing the highest degree of correlation with said simultaneously produced voltage levels producing the resultant voltage level of greatest magnitude; and a plurality of threshold circuit networks connected in tandem, each threshold network being biased at a higher threshold level than the next preceding one and including as many threshold circuits as resultant voltage levels produced by said correlation detectors, the threshold circuits of the first of said tandem-connected networks being respectively coupled to said correlation detectors for respectively receiving the voltage levels therefrom, the threshold circuits of each threshold network receiving only those voltage levels that are passed by the threshold circuits of the next preceding threshold network and adapted to pass only those of said received voltage levels that exceed the threshold level to which that threshold network is biased.

References Cited in the file of this patent

UNITED STATES PATENTS

| | | |
|---|---|---|
| 2,589,130 | Potter | Mar. 11, 1952 |
| 2,669,706 | Gray | Feb. 16, 1954 |
| 2,701,305 | Hopper | Feb. 1, 1955 |
| 2,817,771 | Barnothy | Dec. 24, 1957 |
| 2,846,654 | Epstein et al. | Aug. 5, 1958 |
| 2,913,680 | Porter et al. | Nov. 17, 1959 |
| 2,924,812 | Merritt | Feb. 9, 1960 |
| 2,976,516 | Taber | Mar. 21, 1961 |
| 2,977,543 | Lutz et al. | Mar. 28, 1961 |
| 3,000,000 | Eldredge | Sept. 12, 1961 |
| 3,011,152 | Eckdahl | Nov. 28, 1961 |